(12) United States Patent
Yasukawa et al.

(10) Patent No.: US 11,395,261 B2
(45) Date of Patent: Jul. 19, 2022

(54) USER EQUIPMENT AND DATA TRANSMISSION METHOD

(71) Applicant: NTT DOCOMO, INC., Tokyo (JP)

(72) Inventors: Shinpei Yasukawa, Tokyo (JP); Kazuki Takeda, Tokyo (JP); Satoshi Nagata, Tokyo (JP); Qun Zhao, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 106 days.

(21) Appl. No.: 16/473,926

(22) PCT Filed: Dec. 25, 2017

(86) PCT No.: PCT/JP2017/046390
§ 371 (c)(1),
(2) Date: Jun. 26, 2019

(87) PCT Pub. No.: WO2018/123950
PCT Pub. Date: Jul. 5, 2018

(65) Prior Publication Data
US 2021/0136729 A1 May 6, 2021

(30) Foreign Application Priority Data
Dec. 28, 2016 (JP) .............................. JP2016-257019

(51) Int. Cl.
*H04W 72/02* (2009.01)
*H04W 72/10* (2009.01)
(Continued)

(52) U.S. Cl.
CPC ........... *H04W 72/02* (2013.01); *H04L 1/1874* (2013.01); *H04L 1/1887* (2013.01);
(Continued)

(58) Field of Classification Search
CPC ..... H04W 72/02; H04W 72/04; H04W 72/10; H04L 1/1874; H04L 1/1887; H04L 5/0042; H04L 5/0051
(Continued)

(56) References Cited

U.S. PATENT DOCUMENTS

| | | | | |
|---|---|---|---|---|
| 6,543,014 B1* | 4/2003 | Okuyama | ............... | H04L 45/20 370/412 |
| 2002/0054570 A1* | 5/2002 | Takeda | .................. | H04L 1/1809 370/252 |

(Continued)

FOREIGN PATENT DOCUMENTS

CN 105991224 A 10/2016

OTHER PUBLICATIONS

International Search Report issued for PCT/JP2017/046390, dated Feb. 20, 2018 (3 pages).
(Continued)

*Primary Examiner* — Candal Elpenord
(74) *Attorney, Agent, or Firm* — Osha Bergman Watanabe & Burton LLP

(57) ABSTRACT

User equipment in a radio communication system is provided. The user equipment includes a configuration information management unit configured to retain configuration information in relation to a plurality of divided resources that are capable of transmitting data without receiving data transmission permission from a communication device that is different from the user equipment, the plurality of divided resources each being associated with retransmission control processes, and a transmitter configured to select, from the plurality of divided resources, a divided resource that is associated with a given retransmission control process whose retransmission control buffer is empty, so as to transmit data by using the divided resource.

8 Claims, 15 Drawing Sheets

(51) Int. Cl.
H04L 5/00 (2006.01)
H04L 1/18 (2006.01)
(52) U.S. Cl.
CPC .......... H04L 5/0042 (2013.01); H04L 5/0051 (2013.01); H04W 72/10 (2013.01)
(58) Field of Classification Search
USPC ......................................................... 370/252
See application file for complete search history.

(56) References Cited

U.S. PATENT DOCUMENTS

| | | | | |
|---|---|---|---|---|
| 2006/0259844 | A1* | 11/2006 | Kawada | H04L 1/1877 714/748 |
| 2009/0307554 | A1* | 12/2009 | Marinier | H04L 1/1845 714/748 |
| 2017/0013565 | A1* | 1/2017 | Pelletier | H04W 52/365 |
| 2017/0288817 | A1* | 10/2017 | Cao | H04L 1/1819 |
| 2017/0290052 | A1* | 10/2017 | Zhang | H04W 74/004 |
| 2018/0027575 | A1* | 1/2018 | Shi | H04W 72/048 370/336 |
| 2018/0123765 | A1* | 5/2018 | Cao | H04L 1/1893 |
| 2018/0176945 | A1* | 6/2018 | Cao | H04W 72/1268 |
| 2019/0327030 | A1* | 10/2019 | Yoshimoto | H04L 1/0061 |
| 2020/0028640 | A1* | 1/2020 | Yeo | H04L 1/1887 |

OTHER PUBLICATIONS

Written Opinion issued for PCT/JP2017/046390, dated Feb. 20, 2018 (3 pages).
3GPP TS 36.321 V14.0.0; "3rd Generation Partnership Project; Technical Specification Group Radio Access Network; Evolved Universal Terrestrial Radio Access (E-UTRA); Medium Access Control (MAC) protocol specification (Release 14)"; Sep. 2016 (96 pages).
Office Action issued in the counterpart Chinese Patent Application No. 201780080737.0, dated Apr. 1, 2022 (12 pages).

* cited by examiner

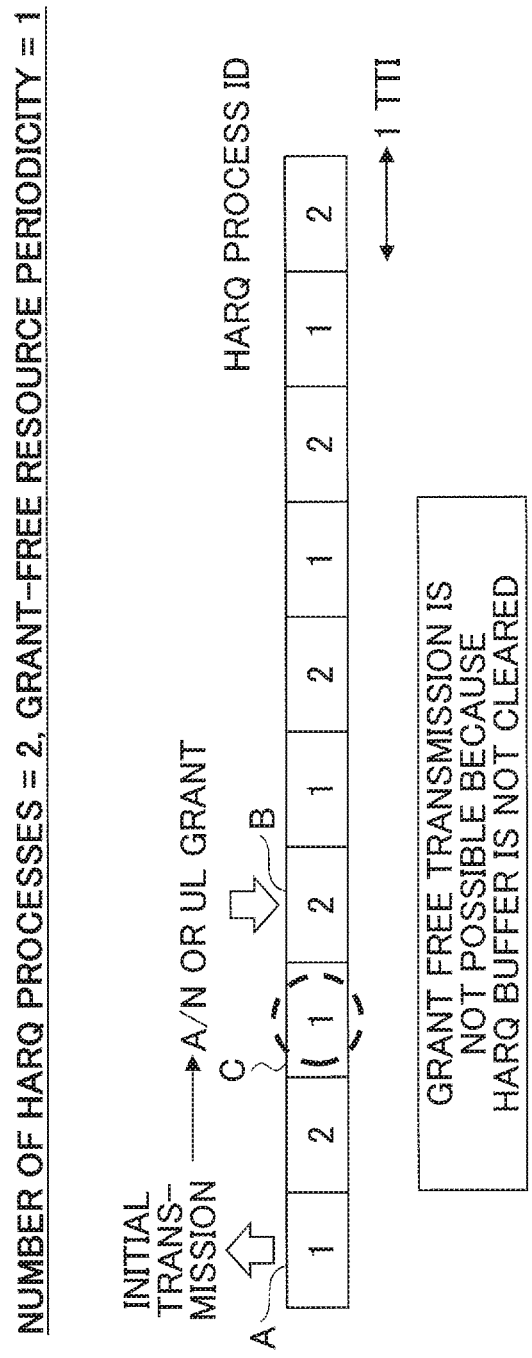

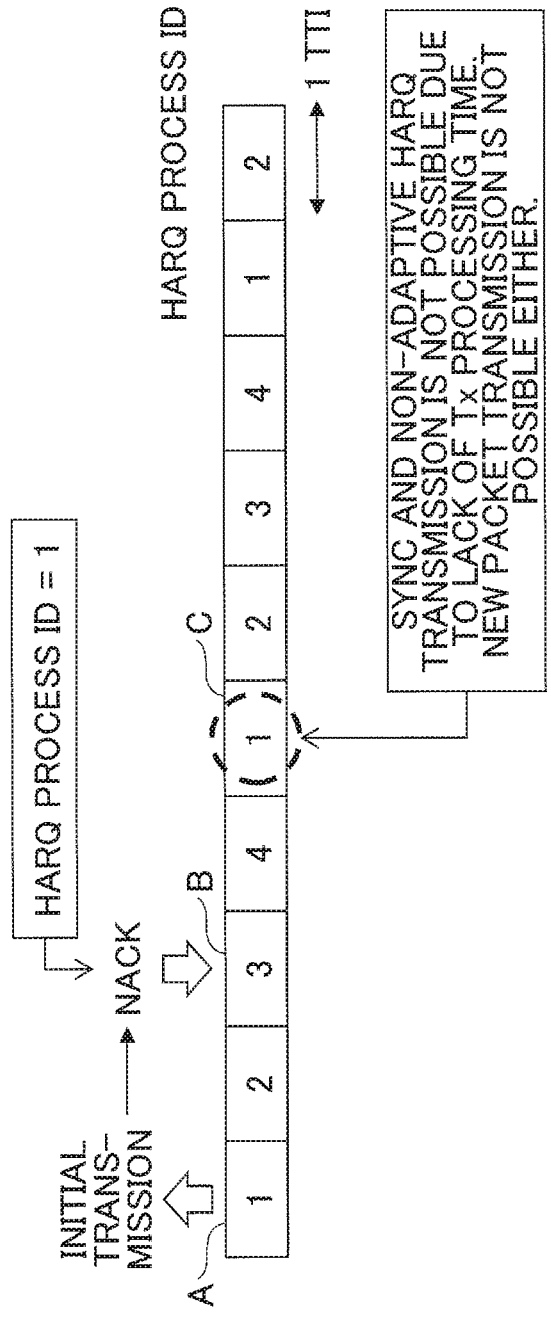

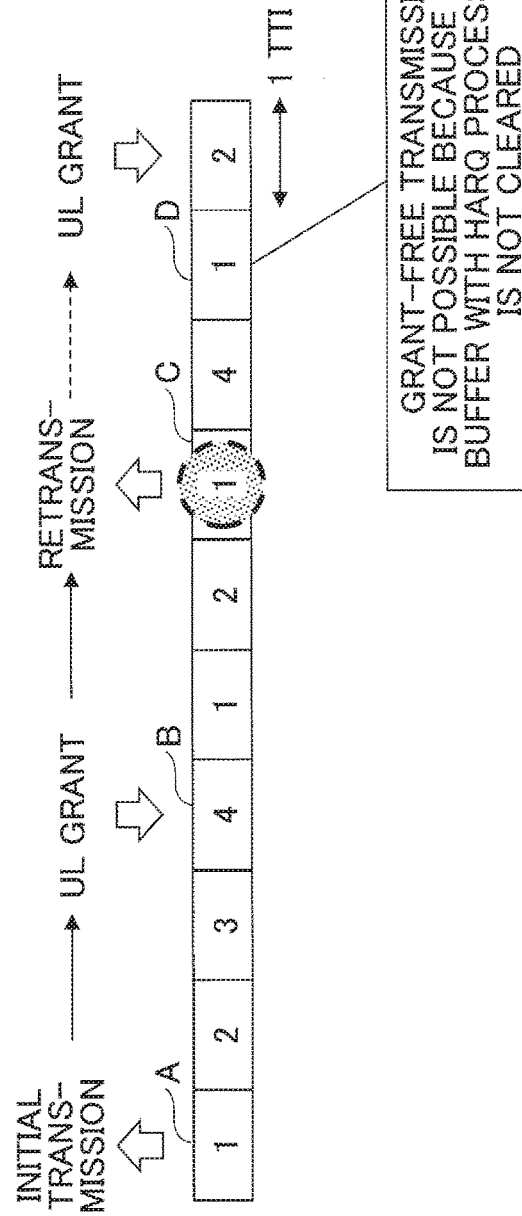

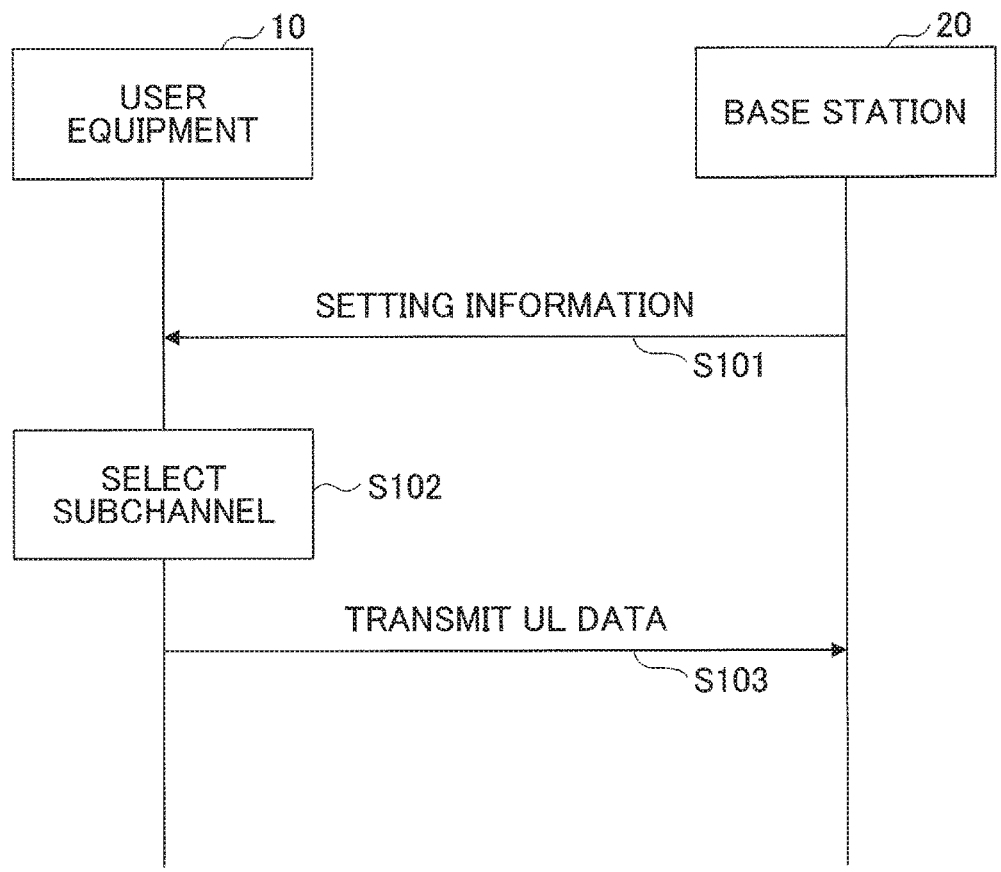

FIG.8A

|  | TTI1 | TTI2 | TTI3 | TTI4 |
|---|---|---|---|---|
| SUBCHANNEL 1 | 1 | 2 | (1) | 2 |
| SUBCHANNEL 2 | 2 | 1 | 2 | 1 |
| SUBCHANNEL 3 | 1 | 2 | 1 | 2 |
| SUBCHANNEL 4 | 2 | 1 | 2 | 1 |

SELECTION CANDIDATES

1 TTI

FIG.8B

|  | TTI1 | TTI2 | TTI3 | TTI4 |
|---|---|---|---|---|
| SUBCHANNEL 1 | (1) | 2 | 1 | 2 |
| SUBCHANNEL 2 | 2 | 1 | 2 | 1 |
| SUBCHANNEL 3 | 1 | 2 | 1 | 2 |
| SUBCHANNEL 4 | 2 | 1 | 2 | 1 |

SELECTION CANDIDATES

1 TTI

FIG.9A

|  | TTI1 | TTI2 | TTI3 | TTI4 |
|---|---|---|---|---|
| SUBCHANNEL 1 | 1 | 1 | 1 | 1 |
| SUBCHANNEL 2 | 2 | 2 | 2 | 2 |
| SUBCHANNEL 3 | (3) | 3 | (3) | 3 |
| SUBCHANNEL 4 | 4 | 4 | 4 | 4 |

UE#1          1 TTI

FIG.9B

|  | TTI1 | TTI2 | TTI3 | TTI4 |
|---|---|---|---|---|
| SUBCHANNEL 1 | 1 | 2 | (3) | 4 |
| SUBCHANNEL 2 | 2 | 3 | 4 | 1 |
| SUBCHANNEL 3 | (3) | 4 | 1 | 2 |
| SUBCHANNEL 4 | 4 | 1 | 2 | 3 |

UE#2          1 TTI

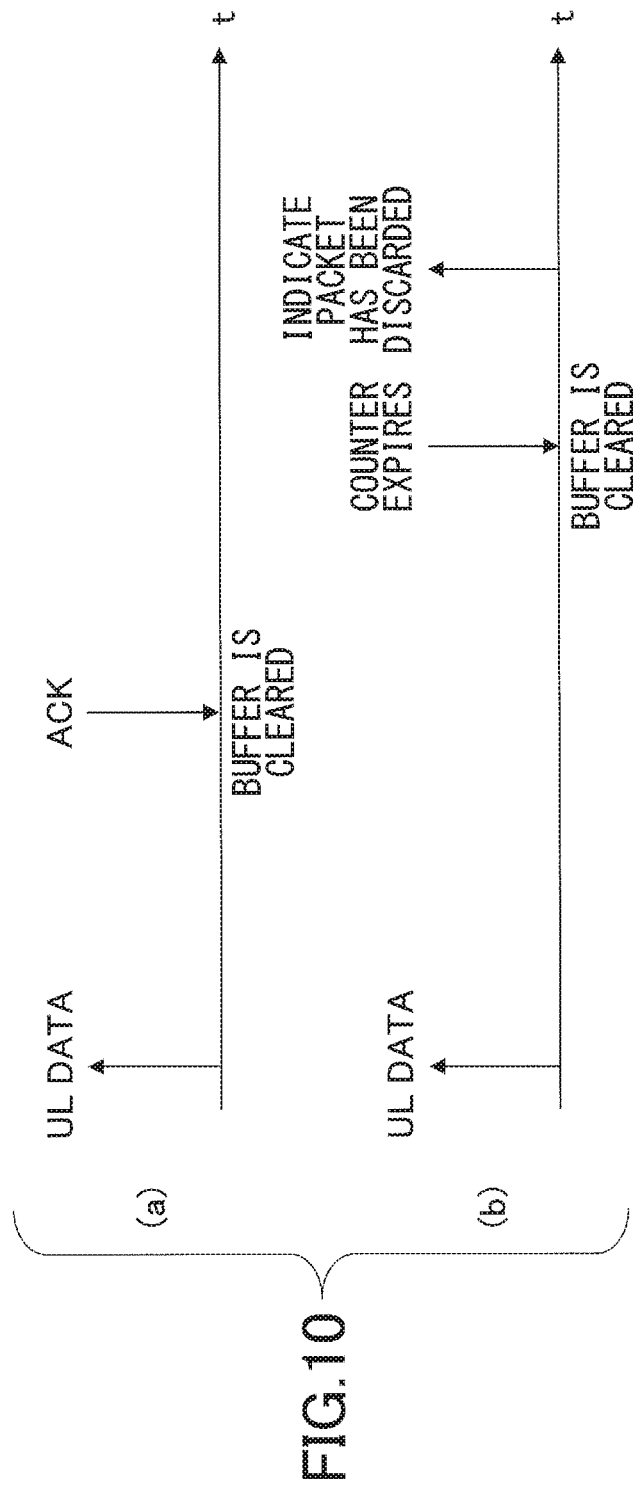

FIG.13

|  | TTI1 | TTI2 | TTI3 | TTI4 |
|---|---|---|---|---|
| SUBCHANNEL 1 | 1 | 2 | 3 | 4 |
| SUBCHANNEL 2 | 2 | 3 | 4 | 1 |
| SUBCHANNEL 3 | 3 | 4 | 1 | 2 |
| SUBCHANNEL 4 | 4 | 1 | 2 | 3 |

|  | TTI1 | TTI2 | TTI3 | TTI4 |
|---|---|---|---|---|
| SUBCHANNEL 1 |  |  |  |  |
| SUBCHANNEL 2 |  |  |  |  |
| SUBCHANNEL 3 |  |  |  |  |
| SUBCHANNEL 4 |  |  |  |  |

USER EQUIPMENT AND DATA TRANSMISSION METHOD

TECHNICAL FIELD

The present invention relates to user equipment in a radio communication system.

BACKGROUND ART

Currently in the 3GPP (3rd Generation Partnership Project), a next-generation system called 5G has been investigated, as a successor to Long-Term Evolution (LET)-Advanced, which is a 4th generation radio communication system. In 5G, mainly, three use cases of extended mobile broadband (eMBB), massive machine type communication (mMTC), and ultra-reliability and low-latency communication (URLLC) have been expected.

URLLC aims to achieve low-latency and high-reliability radio communication. As specific measures to achieve low latency in URLLC, implementation of a short TTI length (also referred to as a subframe length and a subframe interval), reduction in a control delay from packet generation to data transmission, and the like have been considered. Further, as specific measures to achieve high reliability in URLLC, implementation of a coding scheme and a modulation scheme with a low coding rate so as to achieve a low bit error rate, utilization of diversity, and the like have been considered.

In URLLC, there is a possibility that transmission data of high urgency may suddenly arise, and such data needs to be transmitted with low latency and high reliability.

For example, in LTE UL (uplink) communication, when data to be transmitted arises in user equipment, the user equipment first transmits a scheduling request (SR) to a base station so as to request resource allocation from the base station. As a UL grant (UL transmission permission), the base station indicates resource allocation to the user equipment. The user equipment transmits data on a resource specified by the base station.

However, in URLLC, data to be transmitted may suddenly arise as described above. Thus, in a case where data transmission is performed based on a UL grant, there may be a possibility that required low latency conditions cannot be met.

In light of this, grant-free UL multiple-access has been considered. The grant-free UL multiple-access allows user equipment to perform UL data transmission without receiving a UL grant by preliminarily allocating overlapped (or orthogonal) UL resources to a plurality of user equipment devices in higher layer signaling. In order for a base station to identify and separate data received from the plurality of user equipment devices, various schemes haven been considered, such as a scheme using code spreading on a per-user-equipment basis and a scheme using interleaving. In terms of achieving low-latency UL data transmission, the grant-free UL multiple-access is an effective way. The grant-free UL multiple-access is an UL transmission method in which resource allocation to one or more transport blocks transmitted at certain timings is not sequentially indicated by a base station. The grant-free UL multiple-access may be a UL transmission method in which user equipment selects a resource from preliminarily determined or preliminarily configured resource candidates, or may be a UL transmission method based on semi-persistent scheduling configured for a terminal by the base station, or may include a configuration in which downlink L1/L2 control signals may also be used for resource activation/deactivation or updates.

In 5G, similarly to LTE, retransmission control called Hybrid ARQ (HARQ) (Non-Patent Document 1) that efficiently compensates for packet errors occurring in a wireless area with a short control delay time is assumed to be performed.

In user equipment and a base station in LTE, HARQ control is performed by a HARQ entity in a media access control (MAC) layer. Particularly, in HARQ control for uplink (UL) data transmission in the user equipment, the user equipment retains data in a HARQ buffer and performs transmission basically based on a UL grant. Also, for retransmission, there are UL grant-based retransmission (adaptive control) and NACK-based retransmission (non-adaptive control).

Also, HARQ control for one transport block is referred to as a HARQ process. In HARQ control, operations can be performed in parallel for multiple transport blocks. For example, in order to perform parallel HARQ operations for eight transport blocks, eight HARQ processes from HARQ process #1 through HARQ process #8 are performed. For UL transmission, user equipment includes a HARQ buffer for each HARQ process.

HARQ process IDs are associated with respective HARQ processes. As HARQ schemes, there are asynchronous HARQ in which a HARQ process ID is specified for user equipment by a base station, and synchronous HARQ in which a HARQ process ID is determined based on, for example, a subframe number, without a HARQ process ID being specified for user equipment by a base station. In LTE, asynchronous HARQ is performed for DL transmission, and synchronous HARQ is performed for UL transmission.

RELATED-ART DOCUMENTS

Non-Patent Documents

[NON-PATENT DOCUMENT 1] 3GPP TS 36.321 V14.0.0 (2016-09)

SUMMARY OF THE INVENTION

Problem to be Solved by the Invention

In grant-free UL transmission, HARQ control as described above is assumed to be performed. In a HARQ process, a HARQ buffer is cleared (flushed) when retransmission becomes unnecessary, such as when an ACK is received and when a maximum retransmission number of times reaches. If a HARQ buffer for a HARQ process is not free, UL transmission cannot be performed in that HARQ process. Thus, in grant-free UL transmission, even if UL data arises in user equipment and the user equipment attempts to perform UL transmission by using a HARQ process, there may be a case where a HARQ buffer is not free due to a wait for ACK/NACK and UL data transmission is unable to be performed.

Namely, when retransmission control such as HARQ control is performed, there is a problem in that grant-free UL transmission sometimes fails to be promptly performed.

The present invention is made in light of the above, and has an object to provide a technology that allows, in a radio communication system in which resources capable of transmitting data without receiving data transmission permission are configured, user equipment to use the resources to promptly perform data transmission even when performing retransmission control.

Means to Solve the Problem

According to the disclosures herein, user equipment in a radio communication system is provided. The user equipment includes a configuration information management unit configured to retain configuration information in relation to a plurality of divided resources that are capable of transmitting data without receiving data transmission permission from a communication device that is different from the user equipment, the plurality of divided resources each being associated with retransmission control processes, and a transmitter configured to select, from the plurality of divided resources, a divided resource that is associated with a given retransmission control process whose retransmission control buffer is empty, so as to transmit data by using the divided resource.

Effects of the Invention

According to the disclosures herein, a technology is provided that allows, in a radio communication system in which resources capable of transmitting data without receiving data transmission permission are configured, user equipment to use the resources to promptly perform data transmission even when performing retransmission control.

BRIEF DESCRIPTION OF THE DRAWINGS

FIG. 4A is a diagram illustrating an operation example of grant-free UL transmission;

FIG. 4B is a diagram illustrating an operation example of grant-free UL transmission;

FIG. 5 is a diagram illustrating an operation example of grant-free UL transmission;

FIG. 6 is a diagram illustrating an operation example in example 1;

FIG. 7 is a diagram illustrating a setting example of subchannels;

FIG. 8A is a diagram illustrating examples of subchannel allocation and selection candidates;

FIG. 8B is a diagram illustrating examples of subchannel allocation and selection candidates;

FIG. 9A is a diagram illustrating an example of mapping of HARQ process IDs;

FIG. 9B is a diagram illustrating an example of mapping of HARQ process IDs;

FIG. 10 is a diagram illustrating an example in which a buffer is cleared;

FIG. 13 is a diagram illustrating an operation example according to an example 2;

FIG. 14A is a diagram illustrating an operation example according to an example 3;

MODE FOR CARRYING OUT THE INVENTION

In the following, embodiments of the present invention (present embodiments) will be described with reference to the drawings. The embodiments described below are merely examples, and embodiments to which the present invention is applied are not limited to the following embodiments.

An existing technology specified in LTE can be used as necessary when a radio communication system according to the embodiments is operated. However, the existing technology is not limited to LTE. Also, as used herein, the term "LTE" has a broader meaning including LTE-Advanced and systems (such as 5G) after LTE-Advanced, unless otherwise specified. Also, the present invention can be applied to communication schemes other than LTE.

In the embodiments described below, HARQ control based on HARQ control specified in LTE is assumed to be performed; however, the present invention is not limited thereto. The present invention can be applied to various retransmission control schemes. A HARQ process may be referred to as a retransmission control process.

Also, in the following embodiments, terms such as TTI, HARQ, a subcarrier, and a symbol used in the existing LTE are used; however, these terms are used for convenience of description. A signal, a function, and the like similar to these terms may be referred to by other names.

Also, in the following embodiments, an example in which the technology according to the present invention is applied to UL communication from user equipment 10 to a base station 20 will be described. However, the technology according to the present invention is not limited to the UL communication and may be applied to DL communication and sidelink (SL) communication.

For example, the technology according to the present invention can be applied to the DL communication by causing a base station to have functions of user equipment described below, and by causing user equipment to have functions of the base station described below. Also, the technology according to the present invention can be applied to the sidelink (SL) communication by causing one user equipment to have a function to transmit/receive signals similar to signals transmitted/received to/from the base station described below, and by causing another user equipment to have functions similar to those included in the user equipment described below. Devices to which the technology according to the present invention is applied may be collectively referred to as a communication device.

(Overall System Configuration)

Figure 1:
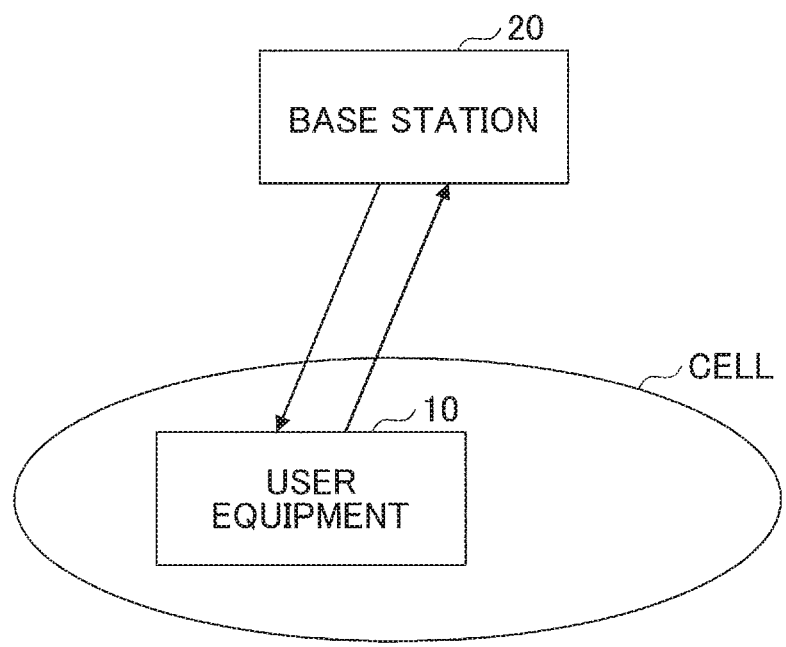
FIG. 1 is a configuration diagram illustrating a radio communication system according to an embodiment of the present invention.

FIG. 1 is a configuration diagram of a radio communication system according to the present embodiments. The radio communication system according to the present embodiments includes user equipment 10 and a base station 20. FIG. 1 illustrates the single user equipment 10 and the single base station 20; however, this is merely an example. The radio communication system may include a plurality of user equipment devices and base stations.

The user equipment 10 is a communication device equipped with a wireless communication function such as a smartphone, a tablet, a wearable device, and a communication module for M2M (Machine-to-Machine). The user equipment 10 wirelessly connects to the base station 20 and utilizes various communication services provided by the radio communication system. The base station 20 is a communication device that provides one or more cells and wirelessly communicates with the user equipment 10. User equipment may be abbreviated to UE.

Figure 2:
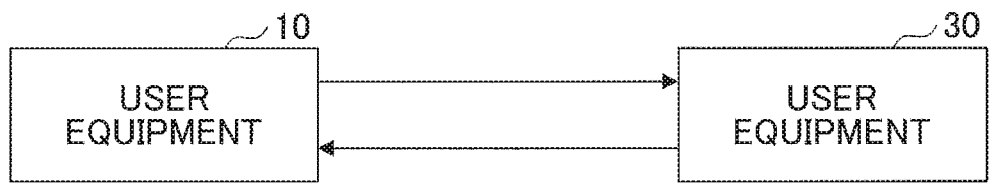
FIG. 2 is a configuration diagram illustrating a radio communication system according to an embodiment of the present invention.

The present embodiments relate to HARQ control when the user equipment 10 transmits UL data. As already described, communication to which the present invention is applied is not limited to communication between the user equipment 10 and the base station 20 as illustrated in FIG. 1. The present invention can be applied to communication between user equipment devices as illustrated in FIG. 2. Namely, the present invention can be applied to sidelink. When the present invention is applied to sidelink, the user equipment devices may be located within coverage of the base station 20 or may be located outside the coverage of the base station 20. Also, the user equipment devices may receive and retain configuration information when located within the coverage of the base station 20, and may use the configuration information when located outside the coverage. Alternatively, default configuration information for use in the outside of the coverage may be preconfigured for the user equipment, and the user equipment may use the default configuration information.

In the present embodiments, a radio frame with one TTI length may be referred to as a subframe. Also, one TTI length may be 1 ms, may be 0.5 ms, or may be a length other than 1 ms and 0.5 ms. The term "radio frame" used in this specification and the claims does not mean the "radio frame" (10 msec) defined in LTE, and means a more general time unit.

A duplex mode according to the present embodiments may be time division duplex (TDD) or may be frequency division duplex (FDD). However, it is assumed that TDD is mainly used. Also, in TDD, UL and DL may be flexibly switched in one TTI.

Figure 3A:
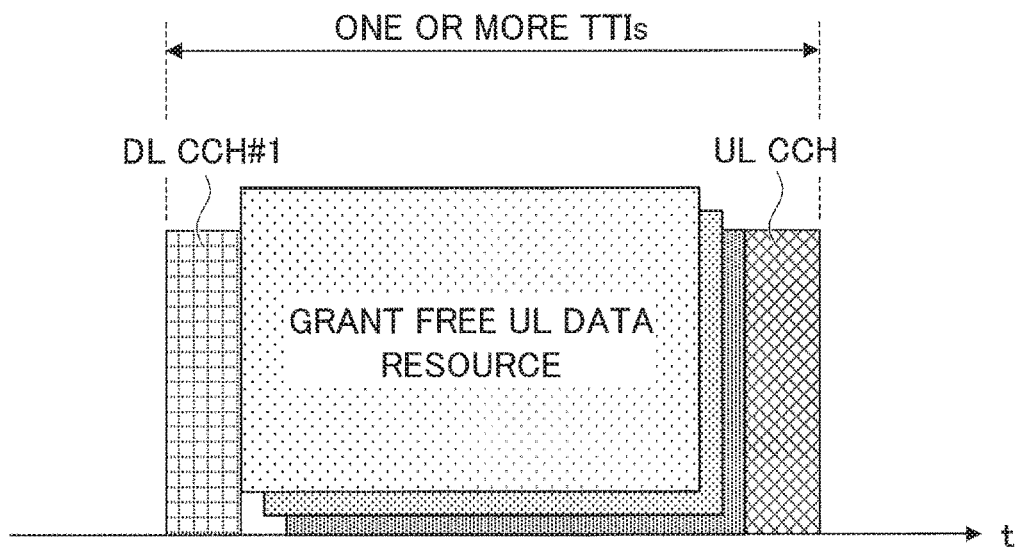
FIG. 3A is a diagram illustrating examples of grant-free UL resources.

The radio communication system according to the present embodiments supports grant-free UL multiple-access. FIG. 3A is a configuration example of a radio frame in which grant-free UL data resource regions are configured. As illustrated in FIG. 3A, a DL CCH #1 that is a downlink control channel and a UL CCH that is an uplink control channel are configured, and grant-free UL data resource regions (rectangles in which the term "grant-free UL data resource" is written) are configured therebetween. FIG. 3A illustrates that the grant-free UL data resource regions are allocated to a plurality of users. However, overlapped resource allocation to a plurality of users is not necessarily assumed, and orthogonal resource allocation may be performed.

A grant-free UL data resource region configured for the user equipment 10 is, for example, a resource pool. In this case, the user equipment 10, for which the resource pool is set, may select a grant-free UL data resource for data communication from the resource pool so as to perform the data communication. Also, the user equipment 10 may use the entire grant-free UL data resource region as a grant-free UL data resource. Also, a specific grant-free UL data resource in the grant-free UL data resource region may be allocated to the user equipment 10 by the base station 20. In this case, the user equipment 10 can use the grant-free UL data resource to perform UL data transmission.

As contemplated from the point of view that a grant-free UL data resource region may be a resource pool, the grant-free UL data resource region may be a sidelink resource pool. In this case, the user equipment 10 may use a grant-free UL data resource to perform sidelink transmission.

For example, by using higher layer signaling or a broadcast signal (system information), DL CCH #1, UL CCH, and a grant-free UL data resource region are configured for the user equipment 10 by the base station 20.

The configuration illustrated in FIG. 3A is merely an example. For example, a configuration that does not include a DL CCH #1, and includes grant-free UL data resource regions and a UL CCH may be used, or a configuration that does not include a DL CCH #1 and a UL CCH, and includes grant-free UL data resource regions may be used.

In semi-persistent scheduling (SPS) in LTE, a HARQ process ID in a TTI (subframe) is determined by SFN and a subframe number (Non-Patent Document 1). For example, when 1, 2, and 3 are used as HARQ process IDs, the HARQ process IDs are periodically determined for each TTI, such as 1, 2, 3, 1, 2, 3 . . . . Also, in UL SPS, as illustrated in FIG. 3B, if there is no data in a transmission buffer of the user equipment 10, no transmission may be performed on a SPS resource (Non-Patent Document 1).

SPS UL resources as described above may be regarded as examples of grant-free UL resources.

Figure 3B:
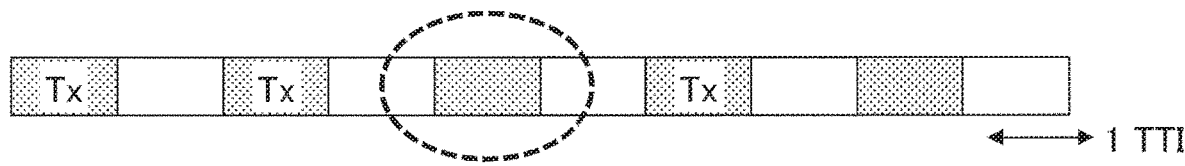
FIG. 3B is a diagram illustrating an example of a grant-free UL resource.

The grant-free UL resources illustrated in FIGS. 3A and 3B are merely examples, and grant-free UL resources according to the present embodiment are not limited to those illustrated in FIGS. 3A and 3B.

(Operation Example of Grant-Free UL Transmission)

In order to facilitate understanding of processing details according to the present embodiments, similarly to the conventional UL SPS, an operation example of grant-free UL transmission when HARQ process IDs are periodically determined for each TTI based on subframe numbers will be described. The technology according to the present invention is not applied to the following description, and the following description corresponds to a detailed description of the above-described problem.

FIG. 4A is an operation example of UL transmission in the user equipment 10, where the number of HARQ processes is 2 and grant-free resource periodicity is 1. One box indicates one TTI and numbers in the boxes indicate HARQ process IDs. The same applies to other drawings. Also, in the following description, TTIs are represented as a TTI (A) and the like by using alphabetical letters such as A, which are indicated by TTI boxes in the drawings.

As illustrated in FIG. 4A, in a first TTI (A) with a HARQ process ID 1, the user equipment 10 performs initial transmission, and in a TTI (B), the user equipment 10 receives an ACK/NACK (written as A/N) or a UL grant. Thus, in a TTI (C) with the HARQ process ID 1, the user equipment 10 is not able to perform grant-free UL transmission because a HARQ buffer is not cleared.

FIG. 4B is an operation example of UL transmission in the user equipment 10, where the number of HARQ processes is 4 and grant-free resource periodicity is 1. In this example, it is assumed that 3 TTIs are required for transmission processing (Tx processing).

As illustrated in FIG. 4B, in a first TTI (A), the user equipment 10 performs initial transmission, and in a TTI (B), the user equipment 10 receives a NACK. In this NACK, a HARQ process ID 1 may be explicitly specified, or the HARQ process ID 1 may be identified based on a time position of the NACK.

Next, in a TTI (C) with the HARQ process ID 1, the user equipment 10 desires to perform retransmission for the initial transmission performed in the TTI (A). However, the user equipment 10 is unable to perform either retransmission or new packet transmission because 3 TTIs have not elapsed after reception of the NACK.

FIG. 5 is an example in which retransmission for a HARQ process ID, which is different from a HARQ process ID deterministically assigned to each TTI in UL grant-based retransmission, is instructed to the user equipment 10. Also, the example illustrated in FIG. 5 is asynchronous HARQ in which a HARQ process ID is indicated in a downlink L1/L2 control channel.

As illustrated in FIG. 5, in a TTI (A), the user equipment 10 performs initial transmission, and in a TTI (B), the user equipment 10 receives a UL grant instructing retransmission with a HARQ process ID 1. In a TTI (C) in which UL transmission becomes possible, the user equipment 10 performs retransmission by using a HARQ process with the HARQ process ID 1. Subsequently, in a TTI (D) in which the HARQ process ID becomes 1, the user equipment 10 is not able to perform grant-free UL transmission because a HARQ buffer of the HARQ process ID 1 is not cleared.

As described above, the scheme based on the existing HARQ has a problem in that transmission using a grant-free UL resource becomes restricted, and thus, transmission cannot be promptly performed. An approach for solving the problem will be described in detail with reference to the following examples. Note that the following examples 1 through 3 may be performed in any appropriate combination.

Example 1

Overall Operation Example

As described above, in grant-free UL transmission based on the conventional HARQ control, even if UL data arises in the user equipment 10, the UL data may frequently fail to be immediately transmitted.

In light of the above, in the present embodiments, multiple subchannels are set in a same TTI. The subchannels are each associated with HARQ process IDs. When UL data arises, the user equipment 10 can select a subchannel in a UL resource so as to perform UL data transmission. A subchannel may be referred to as a "resource". The subchannels may be individually configured on a per-user equipment basis. For example, different subchannel sizes may be configured on a per-user equipment basis, depending on the expected amount of transmission data and/or frequency.

FIG. 6 is a sequence diagram illustrating an example of an operation between the user equipment 10 and the base station 20.

In step S101, the base station 20 transmits configuration information in relation to subchannels to the user equipment 10. The user equipment 10 receives the configuration information and stores the configuration information in a storage unit (which may be referred to as a configuration information management unit) such as memory. A channel on which to transmit the configuration information may be a higher layer signaling channel, may be a broadcast channel, may be a physical layer channel, may be a layer 2 channel, or may be any other channel. An association between the subchannels and HARQ process IDs may be explicitly indicated in the configuration information. Alternatively, a method for calculating HARQ process IDs associated with logical indices of the subchannels may be preliminarily determined, and based on the maximum number of HARQ processes of the user equipment 10, the base station 20 and the user equipment 10 may each calculate HARQ process IDs. For example, a HARQ process ID may be assumed to be calculated by "a logical index of a subchannel mod the maximum number of HARQ processes". In this case, if the logical index of the subchannel is 4 and the maximum number of HARQ processes is 3, the HARQ process ID is 1. When a transmission resource is selected from a plurality of TTIs, HARQ process IDs may be calculated by using resource indices of subchannels (indices of time/frequency resources corresponding to subchannels.)

Also, in order to randomly set index values of resource indices in each user equipment device, an offset value may be individually added to resource indices in each of the user equipment devices. This offset value may be changed based on a time index (for example, a frame number). This is a useful method in order to avoid a resource collision particularly when synchronous HARQ is used.

Note that the base station 20 retains the same configuration information as configuration information configured for the user equipment 10. Thus, based on the configuration information and received UL data, the base station 20 can check the status of HARQ buffers in the user equipment 10.

The user equipment 10 has the same number of HARQ buffers as the number of HARQ processes. For example, if the number of HARQ processes is 3, the user equipment 10 has 3 HARQ buffers. The number of HARQ processes may be preliminarily determined, or may be configured for the user equipment 10 by the base station 20.

In step S102, when new UL data arises in the user equipment 10, the user equipment 10 selects a subchannel, from subchannels that exclude subchannels associated with HARQ processes whose HARQ buffers are not empty. Namely, the user equipment 10 selects a subchannel associated with a HARQ process whose HARQ buffer is free. A subchannel may be selected in the current TTI, or may be selected in a range including a plurality of TTIs. For example, the above-described UL grant-free resource candidates may be used when a subchannel is selected. The UL data is retained in the HARQ buffer of the HARQ process associated with the selected subchannel.

As described, when subchannels having different HARQ process IDs are included in a selection range (for example, in the current TTI), the probability of occurrence of a TTI in which data is unable to be transmitted due to a wait for an ACK/NACK can be reduced.

In step S103, the user equipment 10 uses the subchannel selected in step S102 to transmit the UL data. The UL data remains to be retained in the HARQ buffer of the HARQ process associated with the subchannel. Subsequently, when an ACK is received, the HARQ buffer is cleared, for example. Also, as will be described later, when a predetermined timer (counter) expires, the HARQ buffer may be cleared without receiving an ACK/NACK or a UL grant instructing retransmission.

<Details of Subchannel>

FIG. 7 is a diagram illustrating a setting example of subchannels. In FIG. 7, a horizontal axis indicates time and a vertical axis indicates frequency. In the example of FIG. 7, a frequency resource having a width indicated by A is allocated to the user equipment 10 as a grant-free UL resource. Also, the user equipment 10 can use the frequency resource for a TTI duration (or duration excluding control channels) at predetermined intervals (for example, for each TTI). Such a grant-free UL resource setting may be performed together with the subchannel setting in step S101, or may be performed by signaling different from the subchannel setting. Alternatively, a grant-free UL resource may be preliminarily set (preconfigured).

FIG. 7 illustrates an example in which the user equipment 10 can use a grant-free UL resource for each TTI. In the setting example of subchannels illustrated in FIG. 7, the grant-free UL resource is divided into four subchannels 1, 2, 3, and 4 in a frequency direction. The subchannels may have the same frequency width or may have different frequency widths. Also, in the example of FIG. 7, the number of HARQ processes is 2. In a TTI 1, a HARQ process ID 1 is assigned to the subchannels 1 and 3, and a process ID 2 is assigned to the subchannels 2 and 4. When a TTI increases by 1, the next HARQ process ID is assigned to each of the subchannels (if the current ID is 2, 1 is assigned).

The configuration information transmitted in step S101 of FIG. 6 includes time and frequency resource indices of each of the subchannels (or may include frequency resource indices only). Further, the configuration information may be the number of divisions in the frequency direction of the grant-free UL resource allocated to the user equipment 10. In this case, in the example of FIG. 7, the configuration information indicates that a grant-free UL resource is divided by 4.

The HARQ process IDs associated with the subchannels are explicitly indicated in the configuration information transmitted in step S101. For example, the subchannel 1={1, 2, 1, 2} (which indicates that IDs 1, 2, 1, 2 are assigned to TTIs 1, 2, 3, and 4, respectively), the subchannel 2={2, 1, 2, 1}, the subchannel 3={1, 2, 1, 2}, and the subchannel 4={2, 1, 2, 1} are indicated. Alternatively, instead of explicit indication, a correspondence relationship between time and/or frequency resource indices (numbers) of the subchannels and the HARQ process IDs may be preliminarily determined (the user equipment 10 and the base station 20 retain the same correspondence relationship). In accordance with the correspondence relationship, the user equipment 10 determines a HARQ process ID associated with a given subchannel used in a given TTI. When UL data is received on the given subchannel in the given TTI, the base station 20 can determine a HARQ process ID that is the same as the HARQ process ID identified by the user equipment 10, in accordance with the correspondence relationship.

As an example, a HARQ process ID may be expressed as a HARQ process ID=f(a subchannel number, a subframe number), where the HARQ process ID is a function of the subchannel number and the subframe number (which may be referred to as a TTI number).

Also, as an example of a rule, in the configuration information of S101, HARQ process IDs of each subchannel in a given TTI may be specified for the user equipment 10 by the base station 20, and the user equipment 10 (and the base station 20) may recognize that HARQ process IDs are cyclically changed from the given TTI for each TTI. For example, when the number of HARQ processes is 3 and HARQ process IDs of 1, 2, 3, and 1 are respectively assigned to subchannels 1, 2, 3, and 4 in a TTI 1, the user equipment 10 (and the base station 20) can determine that HARQ process IDs of the subchannel 3 in TTIs 1, 2, 3, and 4 are 3, 1, 2, and 3.

As described above, it is possible to reduce signaling overhead by preliminarily determining a rule, without explicitly specifying HARQ process IDs.

<Selection Candidates>

As illustrated in step S102 of FIG. 6, the user equipment 10 selects a subchannel associated with a HARQ process whose HARQ buffer is free so as to transmit UL data.

As described above, the user equipment 10 may select a subchannel in one TTI (for example, a TTI in which UL data is generated), or may select a subchannel from a plurality of TTIs. FIGS. 8A and 8B are diagrams illustrating examples of selection candidates. FIG. 8A illustrates an example in which resources (subchannels) in TTIs 1 through 4 of the time domain are selection candidates. FIG. 8B illustrates an example in which subchannels in the TTI 1 are selection candidates. In the example of FIG. 8A, the subchannel 1 in the TTI 3 is selected. In the example of FIG. 8A, the subchannel 1 is selected.

For example, in the example of FIG. 8A, when timing at which a subchannel for UL data transmission is selected is the TTI 1, the user equipment 10 can determine whether HARQ buffers at future times (in the TTIs 2 through 4) are empty. Namely, emptiness of HARQ buffers at future times (in the TTIs 2 through 4) can be regarded as emptiness of HARQ buffers in the current TTI 1. Also, it is possible to include, as selection targets, HARQ buffers that are not currently empty, but can be predicted to become empty in the future based on an expiration time of the counter, which will be described later, or based on a control signal (A/N, a UL grant) received from the base station 20.

As in the example illustrated in FIG. 8A, by using a plurality of TTIs, it becomes possible to increase the number of selection candidate resources, while also reducing a collision probability when resource candidates (a resource pool of grant-free UL resources) are shared between user equipment devices.

With regard to a time window (specified by the number of TTIs, for example) in which to include selection candidates, time windows of the same size may be preliminarily determined with respect to user equipment devices 10 and the base station 20. Alternatively, the base station 20 may individually configure a time window on a per-user equipment basis (in a UE-specific manner). Also, a start time position and a duration time (a window width) may be selected by the user equipment 10, or may be selected for the user equipment 10 by the base station 20. Note that the user equipment 10 (or the base station 20) may determine a duration time based on the required delay conditions.

<Reduction in Collision Probability>

Overhead increases when each user equipment device is allowed to select a transmission resource for UL data from different selection candidates (from a plurality of subchannels in one TTI or from a plurality of subchannels in a plurality of TTIs). Accordingly, it is desirable to allocate the same selection candidate resources to a plurality of user equipment devices so as to reduce overhead.

In this case, there may be a possibility that a collision (contention) occurs between user equipment devices. As the arbitrariness of selecting a transmission resource increases, the number of user equipment devices sharing a resource increase. Thus, it may become more difficult for the base station 20 to detect contention and identify (detect) user equipment from which data is transmitted.

In order to reduce the above-described collision probability, mapping between subchannels and HARQ process IDs may be performed in a UE-specific manner. Namely, mapping between subchannels and HARQ process IDs may differ on a per-user-equipment basis.

FIGS. 9A and 9B illustrate an example in which a subchannel configuration of UE #1 is same as that of UE #2 (the same resources are used in the same subchannels), but mapping between the subchannels and the HARQ process IDs differs between the UE #1 and the UE #2.

In the example of FIGS. 9A and 9B, the number of HARQ processes is 4 and subchannels 1, 2, 3, and 4 are configured. The UE #1 illustrated in FIG. 9A uses the subchannel 3 with a HARQ process 3 to perform initial UL data transmission in a TTI 1. In this example, synchronous HARQ retransmission is assumed to be performed in which a subframe interval (a TTI) at which to perform retransmission is preliminarily determined. The UE #1 performs retransmission with the HARQ process 3 in a TTI 3. The retransmission may be performed in response to an instruction (such as a UL grant or a NACK) from the base station 20 or may be autonomously performed by the UE #1. In the mapping illustrated in FIG. 9A, the retransmission is performed on the subchannel 3.

The UE #2 having the mapping illustrated in FIG. 9B performs initial UL data transmission on a resource (the HARQ process ID3) same as that of the UE #1. Because the mapping between the HARQ process IDs and the subchannels differs between the UE #2 and the UE #1, retransmission is performed on a resource (the subchannel 1) different from that of the UE #1.

As described above, it is possible to reduce a collision probability of UL data transmission between user equipment devices by causing mapping between HARQ process IDs and subchannels to be different between the user equipment devices, particularly when synchronous HARQ transmission is performed.

<Notification of HARQ Process ID for Retransmission>

The technology according to the present embodiments can be applied to both adaptive retransmission in which a UL grant is used and non-adaptive retransmission in which a UL grant is not used.

In a case where UL grant-based retransmission is performed, a HARQ process ID used for retransmission may be specified or is not required to be specified in a UL grant for the user equipment 10 by the base station 20.

When a HARQ process ID is not specified, the user equipment 10 can identify a HARQ process ID based on a resource allocated for retransmission in a UL grant (for example, based on a position of a starting frequency resource among time/frequency resources allocated for retransmission). Namely, based on mapping between time/frequency resources and HARQ process IDs as illustrated in FIG. 7, the user equipment 10 can identify a HARQ process ID associated with a resource allocated for retransmission as being a HARQ process ID instructed for retransmission.

To be more specific, in a case where the user equipment 10 receives, on a control channel at a starting position of the TTI 2 illustrated in FIG. 7, a UL grant instructing retransmission, and the subchannel 2 is specified in the UL grant as a resource for retransmission, the user equipment 10 recognizes that the UL grant is a retransmission instruction for the HARQ process ID 1, and uses, for example, the subchannel 2 in the TTI 2 to perform retransmission.

As described, by not specifying a HARQ process ID, it becomes possible to reduce overhead of downlink control information while also enhancing reliability of the downlink control information.

In a case where the base station 20 specifies, in a UL grant for retransmission, a HARQ process ID for retransmission is specified, the user equipment 10 uses the HARQ process ID specified in the UL grant, without using a HARQ process ID associated with a time/frequency resource for retransmission indicated in the UL grant. Note that in a case where the base station 20 specifies, in a UL grant for retransmission, a HARQ process ID for retransmission, the base station 20 may specify a time/frequency resource associated with the HARQ process ID for retransmission as a resource for retransmission.

<Association Between Reference Signals and HARQ Process IDs>

HARQ process IDs may be set in association with reference signal (such as DMRS) configurations. For example, in step S101 of FIG. 6, on a per-subchannel basis, the base station 20 indicates, to the user equipment 10, subchannel resource information and configuration information in relation to an associated reference signal (for example, any one or more of a time/frequency resource position, a sequence, a cyclic shift, and a OCC). A plurality of different reference signals may be associated with a same resource (a same subchannel).

Further, a correspondence relationship between reference signals and HARQ process IDs is determined for each resource (for each subchannel or each pair of a subchannel and a TTI). Examples of the correspondence relationship include {reference signal A, HARQ process ID=N1}, {reference signal B, HARQ process ID=N2}, and the like. The correspondence relationship may be preliminarily set for the user equipment 10 and the base station 20. Alternatively, the correspondence relationship may be configured for the user equipment 10 by the base station 20.

When the user equipment 10 performs UL data transmission by using a HARQ process ID with an empty buffer, the user equipment 10 selects a set of a subchannel and a reference signal from sets of subchannels and reference signals associated with the HARQ process ID (in a case of one set, the set is selected), and uses the selected set of the subchannel and the reference signal to transmit UL data. The base station 20 can identify the HARQ process ID based on the subchannel and the reference signal used to receive the UL data.

By making the above-described association, more HARQ process IDs can be used.

<Notification of Grant-Free UL Resource>

On a per-TTI basis, for example, the base station 20 may indicate, to the user equipment 10, indices of resources (such as time/frequency resources) that are available for grant-free UL transmission (or that are not available for grant-free UL transmission). For example, in the example illustrated in FIG. 7, when the subchannel 1 and the subchannel 2 are available in the TTI 1, the base station 20 indicates, to the user equipment 10, information indicating that the subchannel 1 and the subchannel 2 are available in the TTI 1. The base station 20 may indicate such information prior to the TTI 1 or in the TTI 1 (for example, at the start of the TTI 1). Also, for example, the base station 20 may indicate, for each TTI, a HARQ process ID associated with a resource available for Grant free UL transmission (or not available for Grant free UL transmission). For example, in the example of FIG. 9A, when the subchannel 1 and the subchannel 2 are available in the TTI 1, the base station 20 indicates, to the user equipment 10, information indicating that HARQ process IDs of 1 and 2 are available in the TTI 1.

By indicating such information, resources determined to be used for transmission such as retransmission by one user equipment can be protected from being used for transmission by other user equipment.

<Counter for Clearing HARQ Buffer>

The user equipment 10 may include, for each HARQ process, a counter (which may also be referred to as a timer) for clearing a buffer.

The counter has an initial value. The initial value may be the number of TTIs. The initial value may be a period of time. Note that the number of TTIs may be interpreted as a period of time. The initial value is configured by higher layer signaling (for example, a radio resource control (RRC) signal) transmitted from the base station 20 to the user equipment 10. Also, the initial value may be preliminarily set for the user equipment 10 and for the base station 20.

Similar processing is performed in each HARQ process. At initial UL data transmission in a HARQ process, the counter is reset to the initial value, and the counter is counted for each TTI. Namely, the value of the counter is subtracted by the number of TTIs that have elapsed. If a HARQ buffer of that HARQ process is not cleared by the time the counter becomes 0 (namely, by the time the counter expires), the HARQ buffer is cleared at a time when the counter becomes 0 (namely, at a time when the counter expires).

FIG. 10 illustrates an example. In FIG. 10 (a), after the user equipment 10 transmits UL data, the HARQ buffer is cleared by receiving an ACK before the counter expires. In FIG. 10 (b), after the user equipment 10 transmits UL data, the counter expires and the HARQ buffer is cleared without receiving an ACK/NACK. As illustrated, when the HARQ buffer is cleared by expiration of the counter, the user equipment 10 may transmit, to the base station 20, information indicating that data (a packet) has been discarded (for example, the information includes a HARQ process ID of the discarded data).

As described above, the counter may be counted for each TTI. Alternatively, the counter may be counted for each transmission of UL data in a HARQ process or may be counted for each reception of A/N feedback.

For example, in a case where, after UL data is transmitted from the user equipment 10 or after NACK feedback is transmitted from the base station 20, the user equipment 10 does not receive a UL grant for retransmission within a certain period of time counted by the counter, the user equipment 10 clears a corresponding HARQ buffer. Alternatively, the user equipment 10 may clear the HARQ buffer after non-adaptive retransmission is performed at a certain number of times.

In the user equipment 10, discarding of UL data is indicated from a lower layer (such as a MAC layer) to a higher layer (such as a RRC layer). Further, as illustrated in FIG. 10 (b), the information indicating that the UL data has been discarded is transmitted to the base station 20.

As described above, by controlling clearing of a HARQ buffer by using a counter (timer) that measures a period of time, it becomes possible to avoid loss of an opportunity to transmit new data due to continuous attempts to retransmit data whose acceptable delay time is exceeded.

<Data Transmission in Multiple HARQ Processes>

When there are a plurality of resources (subchannels) associated with different HARQ process IDs, the user equipment 10 may simultaneously transmit data in a plurality of (for example, two) HARQ processes.

As an example, in the TTI 1 (selection candidate TTI) illustrated in FIG. 7, in a case where buffers of both the HARQ processes ID 1 and 2 are empty and the base station 20 indicates that subchannels 2 and 3 are available, the user equipment performs UL data transmission by using the subchannel 2 with the HARQ process ID 2, and at the same time, performs UL data transmission by using the subchannel 3 with the HARQ process ID 1.

A resource size set for grant-free UL transmission is semi-statically determined. Thus, it is assumed that there may be cases where sufficient resources for data stored in a buffer (for example, in a buffer higher than a HARQ buffer, such as an IP data buffer, a PDCP buffer, or a RLC buffer) are not secured. In light of this, by performing the above-described simultaneous transmission, it becomes possible for the user equipment 10 to divide data stored in a buffer into a plurality of packets so as to transmit the divided packets, thus increasing the amount of data that can be transmitted when a predetermined modulation and coding scheme (MCS) is used.

<Operation Example in Dynamic TDD>

In 5G, dynamic TDD that dynamically switches UL and DL is assumed to be introduced. Even if there is a TTI in which UL transmission is unable to be performed because of Dynamic TDD, a synchronous HARQ operation can be performed by utilizing the technology described in the present embodiments and HARQ process ID settings on a per-subchannel basis.

Figure 11A:
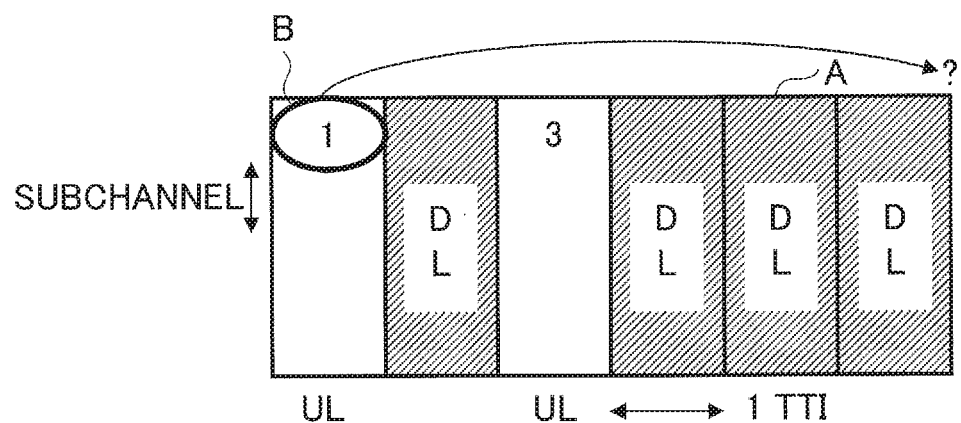
FIG. 11A is a diagram illustrating an operation example in Dynamic TDD.

For example, in a frame illustrated in FIG. 11A, it is assumed that a TTI (A) is originally an UL subframe to which a HARQ process ID 1 is assigned, but is changed to DL by Dynamic TDD. In this case, after the user equipment 10 performs initial UL data transmission in a TTI (B) (the HARQ process ID 1), the user equipment 10 is unable to perform UL transmission in the TTI (A). Thus, retransmission with synchronous HARQ is unable to be performed or a large delay occurs.

Figure 11B:
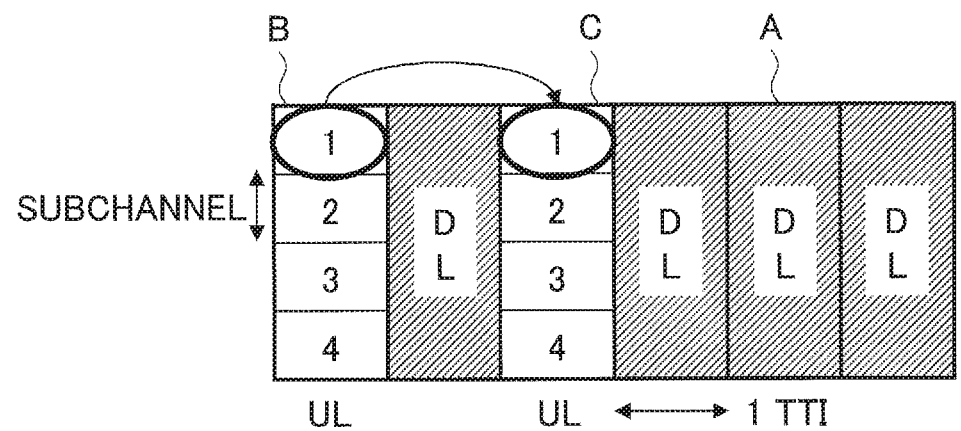
FIG. 11B is a diagram illustrating an operation example in Dynamic TDD.

Conversely, in an example illustrated in FIG. 11B, a UL resource has subchannels, as described above. In this case, after the user equipment 10 performs initial UL data transmission in a TTI (B) (a HARQ process ID 1), the user equipment 10 can perform retransmission on a subchannel with the HARQ process ID 1 in a TTI (C).

<Change of HARQ Process ID>

Figure 12A:
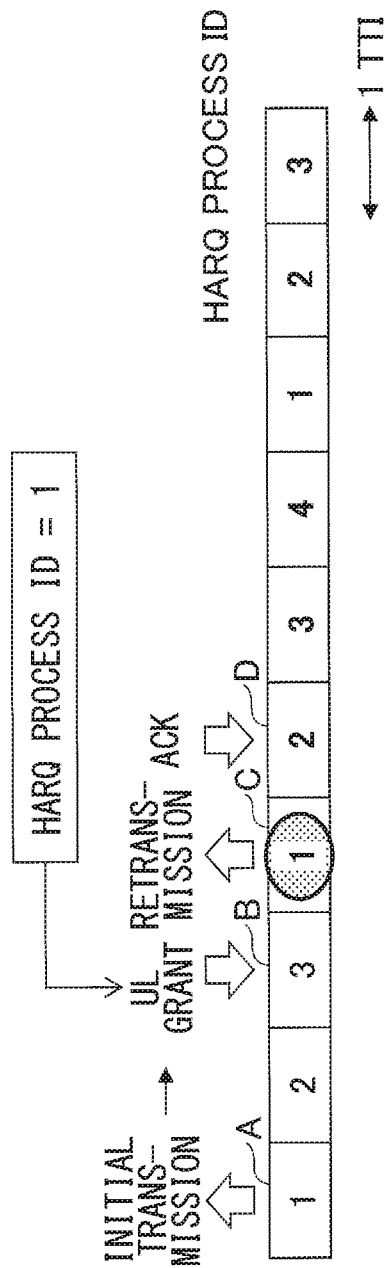
FIG. 12A is a diagram illustrating an example in which HARQ process IDs of a grant-free UL resource are changed.
Figure 12B:
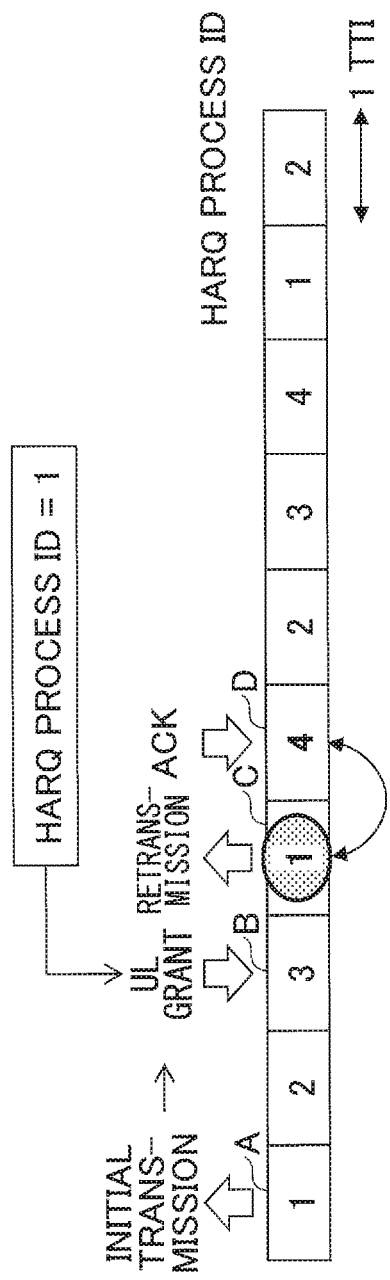
FIG. 12B is a diagram illustrating an example in which HARQ process IDs of a grant-free UL resource are changed.

By using L1/L2 control information such as a UL grant transmitted from the base station 20 to the user equipment 10, HARQ process IDs of grant-free UL resources may be changed. The following description may be premised that subchannels are configured, but is not necessarily premised that subchannels are configured. When subchannels are premised to be configured, it can be considered that FIGS. 12A and 12B illustrate one subchannel. Also, in each example illustrated in FIGS. 12A and 12B, a grant-free UL resource is associated with HARQ process IDs, similarly to the above-described examples.

For example, in the example illustrated in FIG. 12A, the user equipment 10 performs initial UL data transmission (a HARQ process ID 1) in a TTI (A). Subsequently, the user equipment 10 receives a UL grant instructing retransmission, in which the HARQ process ID 1 is specified. In a TTI (C), the user equipment 10 performs UL data retransmission by using a HARQ process with the HARQ process ID 1.

The HARQ process ID in the TTI (C) is originally 4. However, because the HARQ process ID 1 is specified in the UL grant, mapping between the TTI (namely, the grant-free UL resource) and the HARQ process ID is changed. In the example of FIG. 12A, the mapping between the TTIs and the HARQ process IDs is shifted by one TTI to the left. If supposing that the original mapping were maintained in and after the TTI (C), the HARQ process ID of a TTI (D) would be 1. In such a case, because a buffer of the HARQ process ID 1 would be in use, transmission with the HARQ process ID 1 would be unable to be performed in the TTI (D).

Conversely, in this example, by updating mapping, there may a possibility that a HARQ buffer in the TTI (D) (a HARQ process ID 2) is empty. If the buffer is empty, UL transmission can be performed in the TTI (D).

In the example illustrated in FIG. 12B, the user equipment 10 performs initial UL data transmission (a HARQ process ID 1) in a TTI (A). Subsequently, the user equipment 10 receives a UL grant instructing retransmission, in which the HARQ process ID 1 is specified. In a TTI (C), the user equipment 10 performs UL data retransmission by using a HARQ process of the HARQ process ID 1. In the example of FIG. 12B, the HARQ process ID in a TTI (D) has been updated to 4, which is the original HARQ process ID in the TTI (C). In this case, similarly to the case of FIG. 12A, although transmission with the HARQ process ID 1 is unable to be performed in the TTI (D), there may be a possibility that a HARQ buffer of the TTI (D) (HARQ process ID=4) is empty by updating the mapping. If the buffer is empty, UL transmission can be performed in the TTI (D).

Accordingly, it is possible to reduce the frequency of TTIs with unavailable HARQ buffers, thereby achieving low latency grant-free UL transmission.

Example 2

Next, an example 2 will be described. The example 2 is premised on the example 1. In the example 2, the user equipment 10 selects a subchannel based on priorities of HARQ process IDs, when there are multiple subchannels (resources) that can be selected by the user equipment 10 for UL data transmission and the HARQ process IDs are differently configured for the subchannels.

For example, it is assumed that mapping between subchannels and HARQ process IDs illustrated in FIG. 13 is configured for UE #1 and UE #2 (and for the base station 20). Also, for the UE #1, values [1, 2, 3, 4] are configured as priorities for HARQ process IDs, and for the UE #2, values [3, 4, 1, 2] are configured as priorities for HARQ process IDs. The values [1, 2, 3, 4] are arranged in descending order of priorities. In this case, the HARQ process ID 1 has the highest priority. In the case of [3, 4, 1, 2], the HARQ process ID 3 has the highest priority.

In the above configurations, when a HARQ process with the HARQ process ID 1 is available (namely, if a HARQ buffer of the HARQ process ID 1 is empty), the UE #1 selects any resource (for example, randomly selects a resource) from resources (sets of TTIs and subchannels) associated with this ID, and performs grant-free UL transmission. If the HARQ process with the HARQ process ID 1 is not available and a HARQ process with the HARQ process ID 2 is available, the HARQ process with the HARQ process ID 2 is used. In this way, a HARQ process is selected in accordance with priorities. The UE #2 selects a HARQ process in accordance with priorities in the same way.

In the above example, HARQ process IDs are used as priorities for resource candidates for UL data transmission. However, this is merely an example, and information other than HARQ process IDs may be used as priorities for resource candidates for UL data transmission. For example, resource indices (such as subchannel numbers, indices of time/frequency resources, or indices indicating sets of TTIs and subchannels) may be used as priorities for resource candidates, or other identifiers may be used as priorities for resource candidates.

The base station 20 has information in relation to HARQ process IDs available to the user equipment 10. Accordingly, the above-described priority control allows the base station 20 to narrow down resources that are potentially selected by user equipment for UL data transmission based on available HARQ process IDs and priorities. Thus, detection of user equipment becomes easy.

Example 3

In an example 3, as illustrated in FIG. 14A, although a grant-free UL resource is divided (into subchannels), mapping between the subchannels and HARQ process IDs as described above is not performed. In this example, the user equipment 10 indicates a HARQ process ID to the base station 20 when transmitting UL data.

Figure 14B:
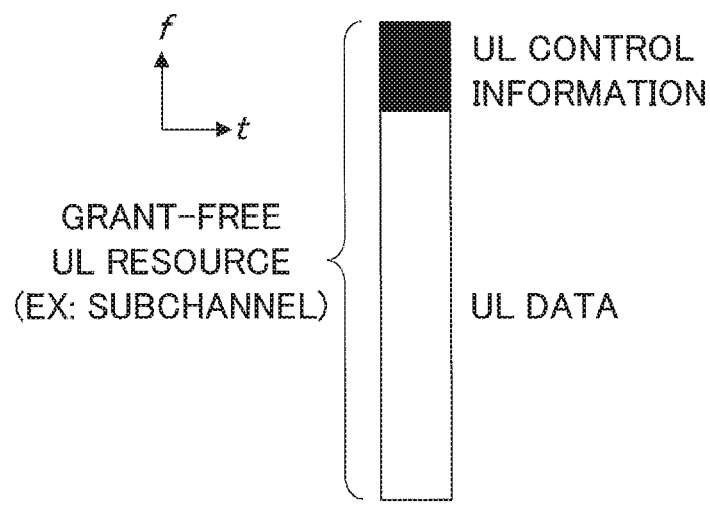
FIG. 14B is a diagram illustrating the operation example according to the example 3.

As an example, it is assumed that the user equipment 10 transmits UL data on a subchannel 2 in a TTI 1 by using a HARQ process with a HARQ process ID 1. In this case, as illustrated in FIG. 14B, the user equipment 10 uses a part of resource of a UL data transmission resource to transmit, to the base station 20, UL control information (or a preamble) having information in relation to the HARQ process ID 1. The base station 20 can obtain the HARQ process ID of the received UL data from the UL control information. Such UL control information is transmitted not only when initial transmission is performed, but also when retransmission is performed.

For example, UL control information may be time-multiplexed, frequency-multiplexed, or code-multiplexed to the data, may be coded with a preliminarily determined MCS, may use a preliminarily determined resource position and/or resource size, and may be transmitted with a preliminarily determined data size. Accordingly, the base station can readily and blindly detect UL control information.

The processing in the example 3 eliminates the need to semi-statically configure HARQ process IDs, and allows the user equipment 10 to transmit UL data with any available HARQ process ID in accordance with a HARQ buffer state.

(Application to Sidelink)

As illustrated in FIG. 1, the above-described examples relate to UL data transmission from the user equipment 10 to the base station 20. However, the technology according to the present invention can be applied to communication between user equipment devices (such as D2D and sidelink), as illustrated in FIG. 2. In this case, in the example of FIG. 2, when attention is paid to data transmission from the user equipment 10 to user equipment 30, the operation of the above-described user equipment 10 is performed by the user equipment 10, and the operation of the above-described base station 20 is performed by the user equipment 30. However, in this case, from the base station 20, the user equipment 10 receives configuration information in relation to mapping between subchannels and HARQ process IDs for data transmission, and the user equipment 30 receives configuration information in relation to mapping between subchannels and the HARQ process IDs for data reception. Instead of receiving the configuration information from the base station 20, the information may be preliminarily configured for the user equipment 10 and for the user equipment 30.

(Device Configuration)

Next, examples of functional configurations of the user equipment 10 and the base station 20 that perform the operations according to the above-described embodiments are described. The user equipment 10 and the base station 20 each include all the functions (including the examples 1 through 3) described in the present embodiments. However, among all the functions described in the present embodiments, the user equipment 10 and the base station 20 may each include a part of functions.

<User Equipment>

Figure 15:
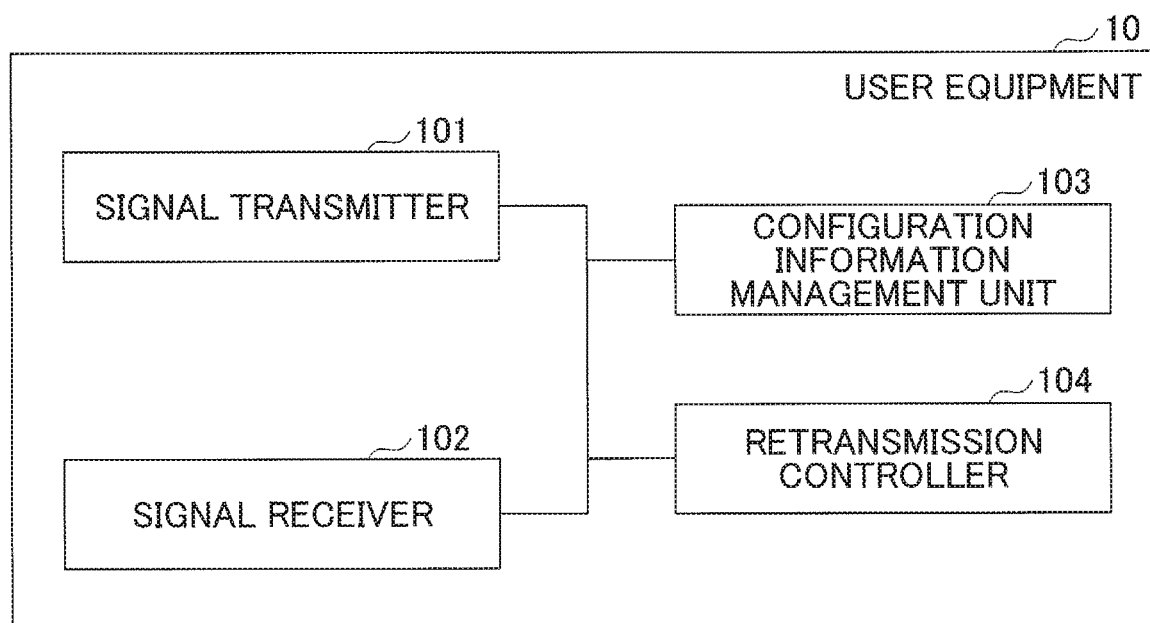
FIG. 15 is a diagram illustrating an example of a functional configuration of user equipment 10.

FIG. 15 is a diagram illustrating an example of a functional configuration of the user equipment 10 according to the embodiments. As illustrated in FIG. 15, the user equipment 10 includes a signal transmitter 101, a signal receiver 102, a configuration information management unit 103, and a retransmission controller 104. The functional configuration illustrated in FIG. 15 is merely an example. As long as the operations according to the present embodiment can be performed, any functional classifications and names of functional units may be used.

The signal transmitter 101 generates a transmission signal from transmission data, and wirelessly transmits the transmission signal. The signal receiver 102 wirelessly receives various types of signals, and obtains higher layer signals from the received physical layer signals. The signal transmitter 101 may be referred to as a transmitting device. The signal receiver 102 may be referred to as a receiving device.

The configuration information management unit 103 stores various types of configuration information received from the base station 20 by the signal receiver 102. Details of the configuration information are as described above. The configuration information management unit 103 also stores configuration information preliminarily set (preconfigured) for the user equipment 10.

The retransmission controller 104 includes a HARQ buffer on a per-HARQ-process basis, and includes a processing functional unit on a per-HARQ-process basis. For example, a processing functional unit of a given HARQ process includes a function to determine whether retransmission is performed based on feedback on UL data transmission from the base station 20. Also, the retransmission controller 104 includes a function to determine HARQ process IDs and a function to select a subchannel based on configuration information, as described in the present embodiment.

The functions of the retransmission controller 104 may be included in the signal transmitter 101. In this case, the signal transmitter 101 may be referred to as a transmitter.

The configuration information management unit 103 may be configured to retain configuration information in relation to a plurality of divided resources that is capable of transmitting data without receiving data transmission permission from a communication device (such as the base station 20 and the user equipment 30), which is different from the user equipment 10.

The plurality of divided resources are each being associated with retransmission control processes. The transmitter may be configured to select, from the plurality of divided resources, a divided resource that is associated with a given retransmission control process whose retransmission control buffer is empty, so as to transmit data by using the divided resource.

The configuration information includes information indicating the plurality of divided resources, and also includes mapping information between the plurality of divided resources and identifiers of the retransmission control processes. Each divided resource of the plurality of divided resources is associated with one or more types of reference signals, and further, the retransmission control processes are associated with the one or more types of reference signals. The transmitter may be configured to, when transmitting the data by using the given retransmission control process, transmit the data by using a reference signal that is associated with the given retransmission control process.

The transmitter includes a counter that measures a period of time, and is configured to clear the retransmission control buffer when elapse of a predetermined period of time has been detected by the counter while the data is being stored in the retransmission control buffer in the given retransmission control process. Priorities are set for the plurality of retransmission control processes used in the transmitter, and the transmitter may be configured to select a retransmission control process whose retransmission control buffer is empty based on the priorities, and select a divided resource that is associated with the retransmission control process.

Also, the transmitter is configured to transmit UL data in which UL control information including a HARQ process ID is multiplexed as described in the example 3.

<Base Station 20>

Figure 16:
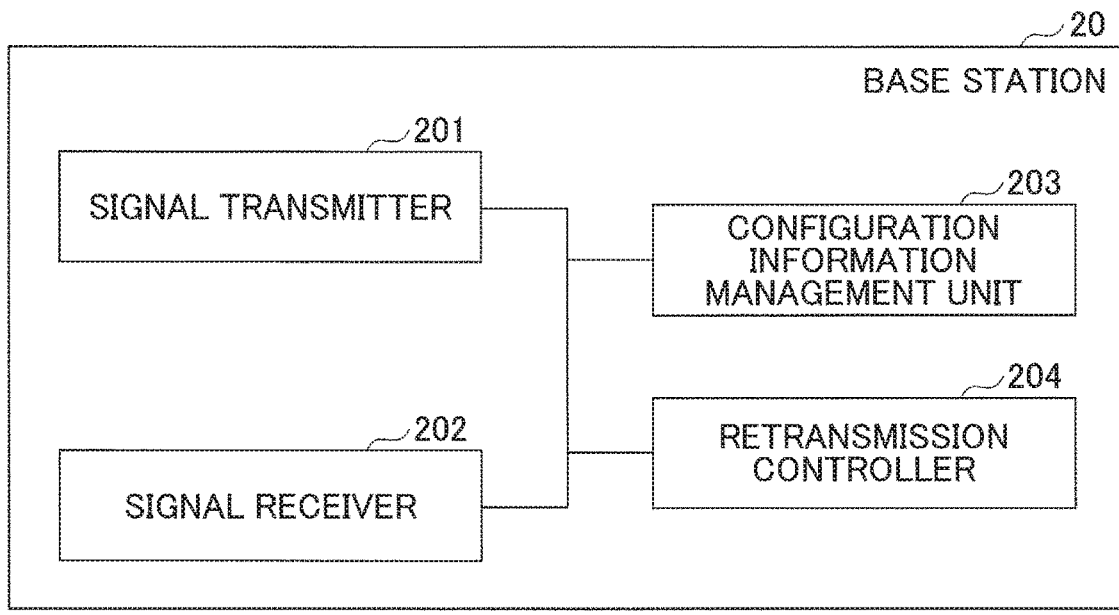
FIG. 16 is a diagram illustrating an example of a functional configuration of a base station 20.

FIG. 16 is a diagram illustrating a functional configuration of the base station 20 according to the present embodiments. As illustrated in FIG. 16, the base station 20 includes a signal transmitter 201, a signal receiver 202, a configuration information management unit 203, and a retransmission controller 204. The functional configuration illustrated in FIG. 16 is merely an example. As long as the operations according to the present embodiments can be performed, any functional classifications and names of functional units may be used.

The signal transmitter 201 includes a function to generate a signal and wirelessly transmit the signal to the user equipment 10. The signal receiver 202 includes a function to receive various types of signals transmitted from the user equipment 10, and obtains higher layer information from the received physical layer signals. The signal transmitter 201 may be referred to as a transmitting device. The signal receiver 202 may be referred to as a receiving device.

The configuration information management unit 203 stores various types of configuration information to be transmitted to the user equipment 10. Details of the configuration information are as described above. The configuration information management unit 203 also stores configuration information preliminarily set (preconfigured) for the base station 20.

The retransmission controller 204 includes a HARQ buffer on a per-HARQ-process basis, and includes a processing functional unit on a per-HARQ-process basis. For example, a processing functional unit of a given HARQ process includes a function to receive UL data, identify a HARQ process ID, perform a decoding process, and return an ACK/NACK or the like. Also, the signal receiver 202 and the retransmission controller 204 include a function to, when UL data in which UL control information including a HARQ process ID is multiplexed as described in the example 3, obtain the HARQ process ID from the UL control information so as to identify the HARQ process ID of the UL data.

<Hardware Configuration>

The block diagrams (FIG. 15 and FIG. 16) used in the above description of the embodiments illustrate functional unit blocks. These functional blocks (components) are implemented in any combination of hardware and/or software. Also, means for implementing the functional blocks are not particularly limited. In other words, the functional blocks may be implemented in one physically and/or logically coupled device or in multiple devices where two or more physically and/or logically separated devices are connected directly and/or indirectly (for example, in wired and/or wireless manners).

Figure 17:
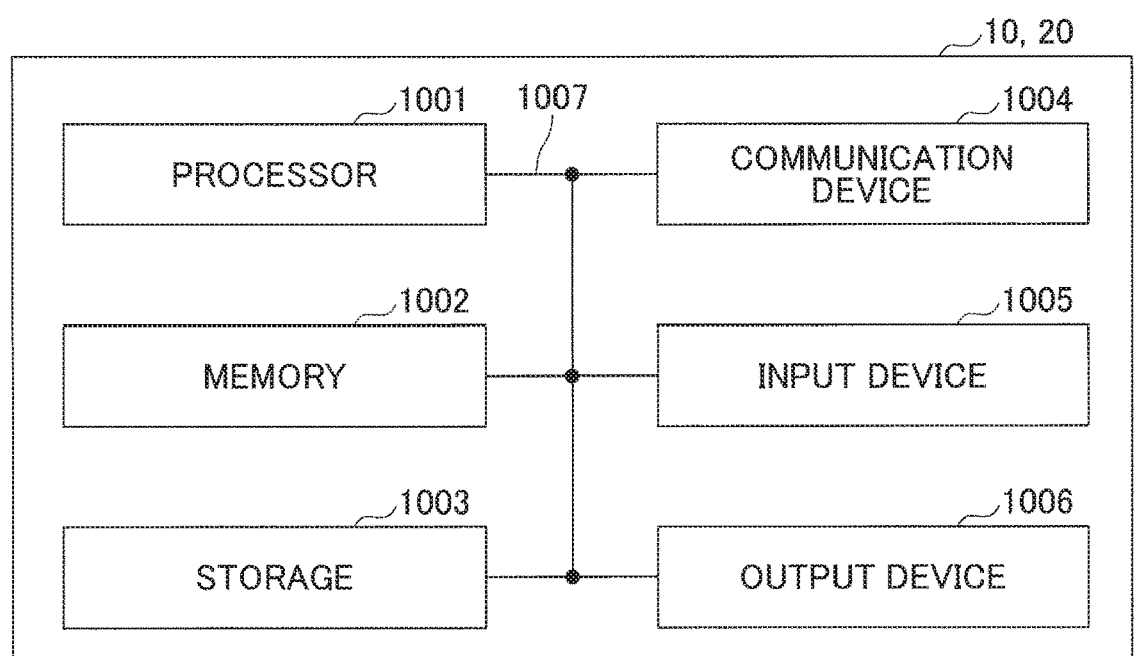
FIG. 17 is a diagram illustrating an example of a hardware configuration of the user equipment 10.

For example, the user equipment 10 and the base station 20 according to one embodiment of the present invention may each function as a computer that performs processes according to the embodiments. FIG. 17 is a diagram illustrating a hardware configuration of the user equipment 10 and the base station 20 according to the embodiments. The above-described user equipment 10 and the base station 20 may each be physically configured as a computer including a processor 1001, a memory 1002, storage 1003, a communication device 1004, an input device 1005, an output device 1006, and a bus 1007.

In the following description, the term "apparatus" can be interchangeably read as a circuit, a device, a unit or the like. The hardware configuration of each of the user equipment 10 and the base station 20 may be configured so as to include the illustrated one or more devices indicated by 1001 through 1006 or so as not to include a part of the devices.

Functions of the user equipment 10 and the base station 20 are implemented by causing hardware such as the processor 1001 and the memory 1002 to read predetermined software (a program) so as to allow the processor 1001 to execute operations, communicate with the communication device 1004, and control reading and/or writing data from/into the memory 1002 and the storage 1003.

The processor 1001 controls the whole computer by, for example, running an operating system. The processor 1001 may be configured by a central processing unit (CPU) including an interface with a peripheral device, a control device, an arithmetic device, and a register.

Also, the processor 1001 reads programs (program codes), software modules, and data from the storage 1003 and/or the communication device 1004 into the memory 1002, and executes various processes in accordance therewith. Examples of the programs include a program for causing the computer to execute at least a part of operations described in the above embodiments. For example, the signal transmitter 101, the signal receiver 102, the configuration information management unit 103, and the retransmission controller 104 of the user equipment 10 illustrated in FIG. 15 may be stored in the memory 1002 and may be implemented by control programs executed by the processor 1001. Also, for example, the signal transmitter 201, the signal receiver 202, the configuration information management unit 203, and the retransmission controller 204 of the base station 20 illustrated in FIG. 16 may be stored in the memory 1002 and may be implemented by control programs executed by the processor 1001. Although an example in which the above-described various types of processes are performed by the single processor 1001 has been described, the processes may be simultaneously or sequentially performed by two or more processors 1001. The processor 1001 may be implemented with one or more chips. Note that the programs may be transmitted from a network via an electric communication line.

The memory 1002 is a computer-readable recording medium, and may include at least one of read-only memory (ROM), erasable programmable ROM (EPROM), electrically erasable programmable ROM (EEPROM), and random-access memory (RAM), for example. The memory 1002 may be referred to as a register, a cache, or a main memory (a main storage device). The memory 1002 can store, for example, programs (program codes) and software modules that can be executed so as to perform the processes according to one embodiment of the present invention.

The storage 1003 is a computer-readable recording medium and, may include at least one of an optical disc such as a compact disc read-only memory (CD-ROM), a hard disk drive, a flexible disk, a magnetic optical disc (such as a compact disc, a digital versatile disc, and a Blu-ray (registered trademark) disk), a smart card, flash memory (such as a card, a stick, and a key drive), a floppy (registered trademark) disk, and a magnetic strip. The storage 1003 may be referred to as an auxiliary storage device. The above-described recording medium may be a database or a server including the memory 1002 and/or the storage 1003, or may be any other appropriate medium.

The communication device 1004 is hardware (a transmitting/receiving device) that performs communication between computers via a wired and/or wireless network, and may be referred to as a network device, a network controller, a network card, or a communication module. For example, the signal transmitter 101 and the signal receiver 102 of the user equipment 10 may be implemented by the communication device 1004. Also, the signal transmitter 201 and the signal receiver 202 of the base station 20 may be implemented by the communication device 1004.

The input device 1005 is an input device (such as a keyboard, a mouse, a microphone, a switch, a button, or a sensor) that receives inputs from the outside. The output device 1006 is an output device (such as a display, a speaker, or a LED ramp) that provides outputs to the outside. Note that the input device 1005 and the output device 1006 may be an integrated device (for example, a touch panel).

Also, the devices such as the processor 1001 and the memory 1002 are connected with each other via the bus 1007 that communicates information. The bus 1007 may be a single bus or may be different buses for different devices.

Also, each of the user equipment 10 and the base station 20 may be configured to include hardware such as a macro processor, a digital signal processor (DSP), an application-specific integrated circuit (ASIC), a programmable logic device (PLD), and a field-programmable gate array (FPGA), and a part or all of the functional blocks may be implemented by the hardware. For example, the processor 1001 may include at least one of these hardware devices.

Summary of Embodiments

As described above, according to the present embodiments, user equipment in a radio communication system is provided. The user equipment includes a configuration information management unit configured to retain configuration information in relation to a plurality of divided resources that are capable of transmitting data without receiving data transmission permission from a communication device that is different from the user equipment, the plurality of divided resources each being associated with retransmission control processes, and a transmitter configured to select, from the plurality of divided resources, a divided resource that is associated with a given retransmission control process whose retransmission control buffer is empty, so as to transmit data by using the divided resource.

With the above configuration, a technology is provided that allows, in a radio communication system in which resources capable of transmitting data without receiving data transmission permission are set, user equipment to use the resources to promptly perform data transmission even when performing retransmission control.

The configuration information may include information indicating the plurality of divided resources, and also includes mapping information between the plurality of divided resources and identifiers of the retransmission control processes. With this configuration, it is possible to clearly identify mapping between a plurality of divided resources and identifiers of retransmission control processes.

Each divided resource of the plurality of divided resources is associated with one or more types of reference signals, and further, the retransmission control processes are associated with the one or more types of reference signals, and the transmitter may be configured to, when transmitting the data by using the given retransmission control process, transmit the data by using a reference signal that is associated with the given retransmission control process. With this configuration, it is possible to increase the number of retransmission control processes that can be used.

The transmitter includes a counter that measures a period of time, and may be configured to clear the retransmission control buffer when elapse of a predetermined period of time has been detected by the counter while the data is being stored in the retransmission control buffer in the given retransmission control process. With this configuration, it is possible to avoid loss of an opportunity to transmit new data due to continuous attempts to retransmit data whose acceptable delay time is exceeded.

Priorities are set for the plurality of retransmission control processes used in the transmitter, the transmitter may be configured to select a retransmission control process whose retransmission control buffer is empty based on the priorities, and select a divided resource that is associated with the retransmission control process. This configuration allows the base station to narrow down resources that are potentially selected by user equipment for UL data transmission based on available HARQ process IDs and priorities. Thus, detection of user equipment becomes easy.

Supplements to Embodiments

Although the embodiments of the present invention have been described above, the disclosed invention is not limited to the embodiments, and persons skilled in the art will appreciate various variations, modifications, alternatives, replacements, and the like. Specific examples of numerical values are used in the description in order to facilitate understanding of the present invention. However, these numerical values are merely examples, and any other appropriate values may be used, unless otherwise specified. Classifications of items in the above description are not essential to the present invention. Depending on necessity, subject matter described in two or more items may be combined and used, and subject matter described in an item may be applied to subject matter described in another item (as long as no contradiction occurs). A boundary of a functional unit or a processing unit in the functional block diagrams does not necessarily correspond to a boundary of a physical component. An operation by a plurality of functional units may be physically executed by a single component, or an operation of a single functional unit may be physically executed by a plurality of components. The orders of the procedures described in the embodiments may be changed as long as no contradiction occurs. For the convenience of description, the user equipment 10 and the base station 20 have been described by using the functional block diagrams; however, such devices may be implemented in hardware, software, or combinations thereof. Software executed by the processor included in the user equipment 10 in accordance with the embodiments of the present invention and software executed by the processor included in the base station 20 in accordance with the embodiments of the present invention may be stored in any appropriate storage medium, such as random-access memory (RAM), flash memory, read-only memory (ROM), EPROM, EEPROM, a register, a hard disk drive (HDD), a removable disk, a CD-ROM, a database, and a server.

Notification of information is not limited to the aspects/embodiments described in this specification and may be performed in any other manner. For example, information may be indicated by physical layer signaling (for example, downlink control information (DCI) and uplink control information (UCI)), higher layer signaling (for example, radio resource control (RRC) signaling, medium access control (MAC) signaling, broadcast information (master information block (MIB), and system information block (SIB))), any other signal, or a combination thereof. Also, the RRC signaling may be referred to as an RRC message, and may be an RRC connection setup message or an RRC connection reconfiguration message.

The aspects/embodiments disclosed in this specification may be applied to systems that utilize Long-Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, UWB (ultra-wideband), Bluetooth (registered trademark), or any other appropriate system, and/or next-generation systems enhanced based on the above systems.

The orders of procedures, sequences, and flowcharts of the aspects/embodiments described in this specification may be changed, as long as no contradiction occurs. For example, in methods described in this specification, various steps are presented in an exemplary order, and are not limited to a specific order presented.

Certain operations described as being performed by the base station 20 may be performed by its upper node, in some cases. In a network including one or more network nodes having the base station 20, it is apparent that various operations performed for communication with the user equipment 10 may be performed by the base station 20 and/or a network node other than the base station 20 (for example, a mobility management entity (MME) or a serving-gateway (S-GW) may be assumed, but the network node is not limited thereto). Although an example in which a single network node other than the base station 20 is used has been described, multiple other network nodes (for example, MMEs and S-GWs) may be used in combination.

The aspects/embodiments described herein may be used alone or may be used in combination, or may be switched at the time of execution.

The user equipment 10 may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate term.

The base station 20 may be referred to by those skilled in the art as a fixed station, NodeB (NB), enhanced NodeB (eNB), a base station, or some other appropriate term.

As used herein, the terms "determining" and "deciding" may include various operations. For example, the terms "determining" and "deciding" may include determining and deciding that calculating, computing, processing, deriving, investigating, looking up (for example, looking up a table, a database, or any other data structure), or ascertaining is considered to be performed. Also, the terms "determining" and "deciding" may include determining and deciding that receiving (for example, receiving information), transmitting (for example, transmitting information), inputting, outputting, or accessing (for example, accessing data in a memory)

is considered to be performed. Also, the terms "determining" and "deciding" may include determining and deciding that resolving, selecting, choosing, establishing, or comparing is considered to be performed. Namely, "determining" and "deciding" may include determining and deciding that any operation is considered to be performed.

As used herein, the term "based on" does not mean "based only on", unless otherwise specified. In other words, the term "based on" means both "based only on" and "based at least on".

As long as the terms "include", "including", and any variation thereof are used in this specification or in the claims, these terms are intended to be inclusive similar to the term "comprising". Further, the term "or" used in this specification or in the claims is intended not to be "exclusive or".

Throughout the disclosures herein, for example, if articles such as "a", "an", and "the" in English are added to the translation, these articles may include plurality, unless the context clearly indicates otherwise.

Although the embodiments of the present invention have been described in detail, it will be readily apparent to those skilled in the art that the present invention is not limited to the embodiments described in this specification. Variations and modifications can be made to the present invention without departing from the scope of the present invention described in the claims. Accordingly, the description of the present specification is intended to provide an illustrative description and is not intended to have any restrictive meaning to the present invention.

The present application is based on and claims priority to Japanese patent application No. 2016-257019 filed on Dec. 28, 2016, with the Japanese Patent Office, the entire contents of which are hereby incorporated by reference.

DESCRIPTION OF THE REFERENCE NUMERALS 10 user equipment
101 signal transmitter
102 signal receiver
103 configuration information management unit
104 retransmission controller
20 base station
201 signal transmitter
202 signal receiver
203 configuration information management unit
204 retransmission controller
1001 processor
1002 memory
1003 storage
1004 communication device
1005 input device
1006 output device

The invention claimed is:

1. A terminal comprising:
a receiver that receives a plurality of pieces of configuration information for a bandwidth part, each piece of configuration information designating a resource by which uplink transmission without transmission permission is available; and
a transmitter that performs uplink transmission using the resource,
wherein each of the plurality of pieces of configuration information is associated with a retransmission control process ID, and
wherein the retransmission control process ID cyclically changes according to an uplink transmission time position.

2. The terminal as claimed in claim 1,
wherein the association between the configuration information and the retransmission process ID is configured in a terminal specific manner.

3. The terminal as claimed in claim 1,
wherein the configuration information includes a timer value for retransmission control.

4. The terminal as claimed in claim 1,
wherein the configuration information includes a parameter for a reference signal and a parameter for the retransmission control process ID.

5. The terminal as claimed in claim 1,
wherein the resource is associated with an index in the configuration information.

6. A communication method executed by a terminal, comprising:
receiving a plurality of pieces of configuration information for a bandwidth part, each piece of configuration information designating a resource by which uplink transmission without transmission permission is available; and
performing uplink transmission using the resource,
wherein each of the plurality of pieces of configuration information is associated with a retransmission control process ID, and
wherein the retransmission control process ID cyclically changes according to an uplink transmission time position.

7. A base station comprising:
a transmitter that transmits a plurality of pieces of configuration information for a bandwidth part, each piece of configuration information designating a resource by which uplink transmission without transmission permission is available in a terminal; and
a receiver that receives uplink transmission using the resource,
wherein each of the plurality of pieces of configuration information is associated with a retransmission control process ID, and
wherein the retransmission control process ID cyclically changes according to an uplink transmission time position.

8. A communication system comprising:
a terminal that comprises:
a first receiver that receives a plurality of pieces of configuration information for a bandwidth part, each piece of configuration information designating a resource by which uplink transmission without transmission permission is available; and
a first transmitter that performs uplink transmission using the resource,
wherein each of the plurality of pieces of configuration information is associated with a retransmission control process ID, and
wherein the retransmission control process ID cyclically changes according to an uplink transmission time position, and
a base station that comprises:
a second transmitter that transmits the plurality of pieces of configuration information; and
a second receiver that receives uplink transmission using the resource.

* * * * *